May 10, 1960
H. D. COGHILL
2,936,246
BURN-RESISTANT PHOSPHORS AND THE
METHOD OF PREPARATION THEREOF
Filed March 26, 1958
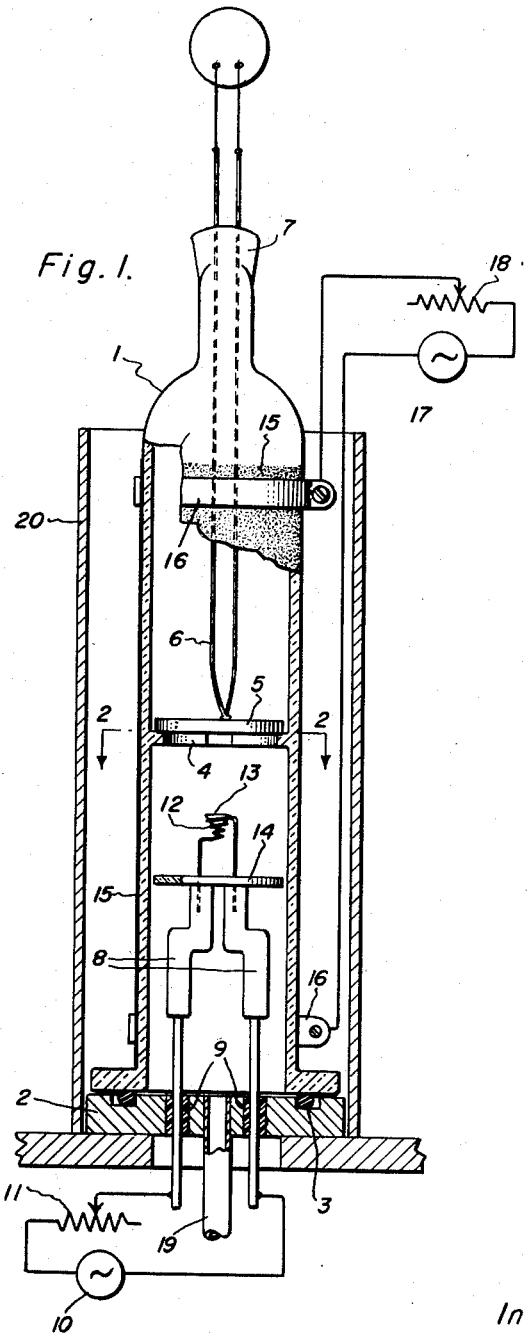
Inventor:
Henry D. Coghill,
by John F. Ahern
His Attorney.

United States Patent Office 2,936,246
Patented May 10, 1960

2,936,246

BURN-RESISTANT PHOSPHORS AND THE METHOD OF PREPARATION THEREOF

Henry D. Coghill, Burnt Hills, N.Y., assignor to General Electric Company, a corporation of New York Application March 26, 1958, Serial No. 724,180

4 Claims. (Cl. 117—33.5)

The present invention relates to luminescent phosphors which exhibit high brightness and high resistance to burn under irradiation by cathode rays.

In the cathodoluminescence art, it is well known that zinc fluoride, particularly when activated with such activators as niobium and manganese is a highly efficient light source when irradiated by cathode rays. Furthermore, zinc fluoride phosphors exhibit long decay times and hence are known as high persistency phosphors, a characteristic which renders them extremely desirable in many applications as, for example, for radar screens. Although of great utility, presently available zinc fluoride phosphors suffer from one defect which limits their usefulness and utility in the formation of devices such as cathode ray tubes for television and radar uses. This disadvantage is that zinc fluoride screens, as formed by presently available processes, are subject to electron or cathode ray burn, and because of this burning, exhibit reduced efficiencies and brightness after long periods of irradiation.

Accordingly, an object of the present invention is to provide improved zinc fluoride phosphors, and methods of preparation thereof, which exhibit greater resistance to electron burn than presently available zinc fluoride phosphors.

In accord with the present invention, I provide high persistency, high brightness, zinc fluoride phosphors which exhibit a high resistance to electron burn under cathode ray excitation by vacuum evaporating a thin transparent layer of activated zinc fluoride phosphor onto a suitable glass substrate while the substrate is maintained at a temperature of from 200–500° C. Because of the temperature at which the screens of the present invention are deposited, they exhibit high brightness, long persistency, high efficiency, and a high degree of resistance to electron burn under cathode ray excitation.

The novel features believed characteristic of the present invention are set forth in the appended claims. The invention itself, together with further objects and advantages thereof, may best be understood with reference to the attached drawing in which:

Fig. 1 is a vertical cross-sectional view of one apparatus with which the present invention may be practiced; and Fig. 2 is a horizontal cross-sectional view taken along the lines 2—2 in Fig. 1.

In the drawing, suitable apparatus for practicing the present invention includes a long cylindrical bell jar 1 which rests on a supporting disk 2, and is vacuum sealed thereto with an O-ring 3. Midway along the length of bell jar 1 there is mounted an annular slotted support ring 4 suitable for supporting a disk-shaped substrate 5 upon which a phosphor layer is to be formed by evaporation. Support ring 4 is shown in elevation in Fig. 2, which is a sectional view taken along the line 2—2 in Fig. 1. Although means for suporting the disk is here shown as attached to bell jar 1, it would equally well have been supported from support disk 2.

A thermocouple 6 is temporarily connected with substrate 5 for measuring the temperature thereof and extends out through a vacuum seal 7 in the uper end of bell jar 1. A pair of conducting support members 8 extend upward through suitable vacuum-tight, insulating members 9 in support plate 2, and are connected with a suitable source of electrical potential, represented generally by alternating current generator 10 and potentiometer 11. An evaporation boat 12, in this instance in the form of a tapered inverted coil, is supported between the interior ends of conducting members 8. Alternatively, evaporation boat 12 may be an open topped cup or any other suitable configuration. Evaporation boat 12 is adapted to hold a compressed pellet 13 of the substance or substances to be evaporated therefrom. A suitable baffle 14 is suported from conducting support member 8 below boat 12 and is shaped to the interior shape and dimension of bell jar 1 to prevent any of the evaporated material of pellet 13 from escaping downwardly from the evaporation boat and into the evacuation exhaust.

The entire lateral surface of bell jar 1 from a region substantially below baffle 14 to the region substantially above the position of evaporation substrate 5 is coated with a thin resistive layer 15, preferably of tin oxide which is contacted with a pair of ring electrodes 16, which in turn, are connected to a source of potential, represented generally by alternating current generator 17 and potentiometer 18. Resistive coating 15 serves as a heater when an electric current is passed therethrough by means of ring electrodes 16, and is the only means by which evaporation substrate 5 is heated in accord with the present invention. This means of heating the evaporation substrate 5 is particularly advantageous since it permits operation at higher substrate temperatures than might ordinarily be obtained and prevents much of the material evaporated from evaporation boat 12 from being deposited on the bell jar walls. A suitable heat shield 20 may surround the entire apparatus to prevent thermal losses. The disclosed apparatus, particularly with respect to the above-mentioned means of heating, does not constitute a part of the present invention, but is disclosed and claimed in the copending application of Lewis R. Koller, Serial No. 724,149, filed concurrently herewith and assigned to the assignee of the present invention.

In operating the aparatus in Fig. 1 to deposit high brightness, high efficiency zinc fluoride cathodoluminescent films which are resistant to electron burn in accord with the present invention, a compressed pellet containing the phosphor constituents is first prepared. This pellet may comprise zinc fluoride activated with an activator quantity of a suitable cathodoluminescence activator, as for example, 0.01 to 5 weight percent of manganese or may contain a physical mixture of zinc fluoride and an equivalent weight of manganese to supply 0.01 to 5 weight percent as an activator. A compressed pellet weighing, as for example, from 0.2 to 0.5 gram of zinc fluoride and manganese is placed within evaporation boat 12. A thermocouple is attached to substrate 5 which is mounted within the supporting ring 4, connected to the interior walls of evaporation bell jar 1, which is then sealed to base plate 2. A vacuum pump is connected to vacuum line 19 and the entire apparatus is evacuated to a pressure of less than 10 microns of mercury and preferably less than 1 micron. Potentiometer 18 is then adjusted to control the electric current flowing from alternating current source 17 through electrode 16 and resistive coating 15 upon bell jar 1 to cause the temperature of substrate 5 to be raised from 200-500° C. Once the temperature of substrate 5 has been raised to the proper temperature and thermal equilibrium has been established, potentiometer 11 is adjusted to cause a suitable current, as for example, 7 amperes at 7 volts alternating current to be passed through evaporation boat 12 to raise its temperature to approximately 1000° C. and cause the evaporation of pellet 13 of zinc fluoride and manganese. The zinc fluoride and manganese then deposit upon the under surface of glass substrate 5 to form a manganese activated zinc fluoride phosphor layer which has superior brightness and efficiency characteristics which is extremely resistant to electron burn, and is transparent.

In performing the process in accord with the present invention, it is important that the substrate be maintained at the desired temperature of 200° to 500° C. At temperatures below 200° C., the resistance to electron burn is not obtained. At temperatures above 500° C., the zinc fluoride begins to react with the oxides comprising the glass substrate with resultant formation of a complex ion phosphor integral with the glass substrate. While this is desirable under certain conditions, it is undesirable when formation of a transparent zinc fluoride phosphor layer is desired. Thus, if this condition occurs, it is necessary to evaporate a much greater amount of zinc fluoride upon the glass substrate in order to obtain the pure yellow luminescence of zinc fluoride. Accordingly, for the formation of zinc fluoride layers upon the surface of the glass, the process must be carried out at a temperature of 500° C. or less. Since greater resistance to electron burn is obtained near 500° C. than at lower temperatures, I prefer to practice the invention at substrate temperatures below, but approximately near 500° C.

As an example of the improved and desirable characteristics of manganese activated zinc fluoride films deposited in accord with the present invention, it may be noted that whereas the initial brightness of a 2 micron thick layer deposited at a substrate temperature of 25° C., exhibits an initial brightness of only 5 foot lamberts, this initial brightness increases up to approximately 90 foot lamberts, when the film is deposited at a substrate temperature of approximately 500° C. The foregoing brightnesses are obtained using a standard television raster illuminated with 10 kilovolt cathode rays at a current density of 1 microampere per square centimeter.

As a further advantage of manganese activated zinc fluoride screens deposited in accord with the present invention, it is further noted that whereas a 2 micron thick layer of manganese activated zinc fluoride vacuum evaporated upon a substrate maintained at 25° C., after 30 minutes of irradiation using a standard television raster illuminated with cathode rays at 10 kilovolts potential and current density of 1 microampere per square centimeter, exhibits a terminal brightness only 43 percent its initial brightness, equivalent thickness layers of manganese activated zinc fluoride deposited at 200, 300 and 500° C. substrate temperatures and irradiated a similar length of time under the same conditions with cathode rays, exhibit a terminal brightness of 73 percent, 90 percent and 100 percent of the initial brightness.

It is apparent therefore from the foregoing information that manganese activated zinc fluoride cathodoluminescent screens vacuum evaporated at substrate temperatures of from 200 to 500° show greatly improved brightness and burn resistance characteristics as compared with the same phosphor screens vacuum evaporated with the substrate at room temperature.

While the invention has been set forth hereinbefore with respect to the general practice thereof, following specific examples are given in order that those skilled in the art may determine specific circumstances under which the invention has been practiced. These examples are set forth in an exemplary manner only and are not to be construed in a limiting sense.

*Example 1.*—The apparatus illustrated in Fig. 1 is used. A 0.2 gram compressed pellet of luminescent zinc fluoride activated with 5 weight percent manganese is inserted in the evaporation boat which was a 0.020 inch thick, ½ inch long, ⅛ inch diameter helix of platinum. A 2 inch diameter ⅛ inch Pyrex glass disk was mounted in the bell jar. The system was closed and evacuated to a pressure of less than 1 micron of mercury. The electrical connections were completed through the resistance coating heater to raise the temperature of the substrate to 500° C. When thermal equilibrium had been achieved, the electric current was supplied through the boat to raise it to a temperature of approximately 1000° C. and causing the entire pellet to be evaporated depositing a transparent layer approximately 2 microns thick of manganese activated zinc fluoride upon the lower surface of the glass disk. After the apparatus had cooled, the disk was mounted as the face plate of demountable cathode ray tube and, under excitation of a 10 kilovolt cathode ray raster at a current density of 1 microampere per square centimeter, the disk exhibited a brightness of approximately 90 foot lamberts which did not decrease after one-half hour of this type of irradiation, indicating the absence of cathode ray burn.

*Example 2.*—The identical manipulative steps as set forth in Example 1 above, were performed with the exception that the substrate was maintained at an operating temperature of 300° C. After evaporation, the substrate was cooled, removed and mounted in a demountable cathode ray tube, and irradiated with 1 microampere per square centimeter television raster at 10 kilovolts. Under this excitation the screen emitted 20 foot lamberts of light which decreased to 90 percent of this value after one-half hour bombardment, indicating slight, but nevertheless acceptable electron burn under cathode ray excitation.

While the invention has been set forth hereinbefore with respect to particular modes of practice thereof, many modifications and changes will readily become apparent to those skilled in the art. Accordingly, I intend by the appended claims to cover all such modifications and changes as fall within the true spirit and scope of the foregoing disclosure.

What I claim as new and desire to secure by Letters Patent of the United States is:

1. The method of forming a high brightness long persistency luminescent screen which exhibits high resistance to cathode ray burn which method comprises supporting a vitreous transparent substrate in an evacuable reaction chamber, heating the substrate to a temperature of 200° C to 500° C., heating the walls of said chamber in the vicinity of said substrate, and vacuum evaporating a thin layer of zinc fluoride together with an activator quantity of a manganese activator upon the heated substrate.

2. The method of forming a high brightness long persistency luminescent screen which exhibits high resistance to cathode ray burn which method comprises supporting a glass substrate in an evacuable reaction chamber, heating the substrate to a temperature of 200° C. to 500° C., heating the walls of said chamber in the vicinity of said substrate and vacuum evaporating a thin layer of zinc fluoride together with 0.01 to 5 weight percent of manganese upon the heated substrate.

3. The method of forming a high brightness long persistency luminescent screen which exhibits high resistance to cathode ray burn which comprises supporting a glass substrate in an evacuable reaction chamber, heating the substrate to a temperature of 200° C. to 500° C., heating the walls of said chamber in the vicinity of said substrate and vacuum evaporating a layer of manganese activated zinc fluoride upon the heated substrate.

4. The method of forming a high brightness long persistency luminescent screen which exhibits high resistance to cathode ray burn which comprises supporting a vitreous transparent substrate in an evacuable reaction chamber, heating the substrate to a temperature of approximately 500° C., and vacuum evaporating a thin layer of manganese activated zinc fluoride upon the heated substrate.

References Cited in the file of this patent

UNITED STATES PATENTS

| | | |
|---|---|---|
| 2,398,382 | Lyon | Apr. 16, 1946 |
| 2,421,208 | Leverenz | May 27, 1947 |
| 2,685,530 | Cusano et al. | Aug. 3, 1954 |
| 2,732,312 | Young | Jan. 24, 1956 |
| 2,789,062 | Cusano et al. | Apr. 16, 1957 |